Sept. 30, 1941.     K. RABE     2,257,571
SPRING SUSPENSION MEANS FOR VEHICLES
Filed June 22, 1938
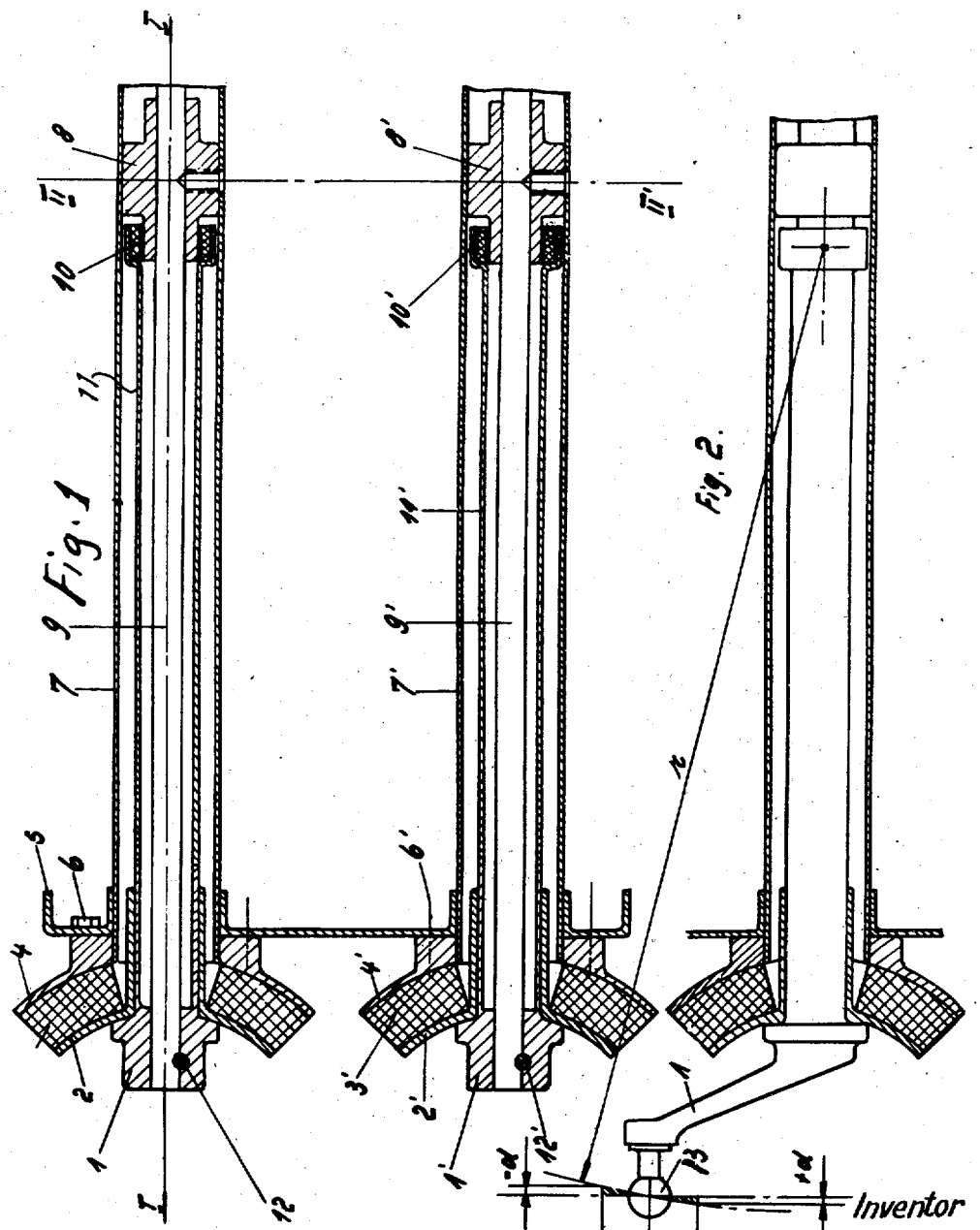

Patented Sept. 30, 1941

2,257,571

UNITED STATES PATENT OFFICE 2,257,571

SPRING SUSPENSION MEANS FOR VEHICLES

Karl Rabe, Stuttgart, Germany, assignor to Dr. ing. h. c. F. Porsche, K.-G., Stuttgart-Zuffenhausen, Germany, a company of Germany Application June 22, 1938, Serial No. 215,117
In Germany July 9, 1937

8 Claims. (Cl. 267—57)

This invention relates to spring suspension means for vehicles and has as an object to provide an improved spring suspension means particularly for power driven vehicles.

Other objects are to provide improved spring mechanism composed of relatively few parts, which parts can be easily and cheaply manufactured and assembled.

Another object is to provide such spring suspension means in which rubber or the like is provided as auxiliary spring means.

Another object is the provision of a spring suspension means in which there is no rigid connection between the wheel carrying means and the frame of the vehicle, and in which resilient means are interposed therebetween which permit not only relatively vertical movement but also relative movement longitudinally of the vehicle so as to reduce or eliminate shocks due to the application of horizontal forces to the wheel carrier.

Another object is to accomplish said purposes by means of an annular plane or spherical member of rubber or the like interposed between the wheel carrying member and the frame and serving to absorb vertical shocks, horizontal shocks, act as an auxiliary spring and serve as a shock absorber or damping element.

Another object is to provide such a spring suspension means in which a rotary spring means such as a torsion bar is provided as the main spring element, and in which a tube or the like is provided for sustaining the bending stresses which member may surround the torsion bar and may extend toward or beyond the central plane of the vehicle thus providing a relatively long radius of swing for the wheel carrying members.

Another object is the provision of a torsion bar spring of steel or the like in combination with an auxiliary spring of rubber or the like, which assists the steel spring and itself permits of radial motion thereof relative to the frame.

Further objects and advantages of this invention will be apparent from consideration of the specification as illustrated by the accompanying drawing of possible embodiments of the invention, in which drawing:

Fig. 1 shows vertical section of a device in which two spring suspended levers are arranged one above the other which levers may form two links of a parallelogram or other quadrilateral linkage and Fig. 2 shows a corresponding horizontal section taken along the line I—I of Fig. 1.

In said figures 1, 1' designate two levers to which the wheel carrying means are attached. Said levers form two links of a parallelogram or other quadrilateral, the other two links of which are the frame and the wheel carrying member. A generally similar construction is shown in British patent to Porsche 385,812. Said levers have attached thereto shells 2, 2', respectively, preferably for motion therewith.

Shells 4, 4' are shown as attached to the frame 5 as by means of screws 6, 6'. Interposed between shells 2 and 4 is the member 3 of rubber or the like preferably firmly attached thereto as by vulcanization or otherwise; and a similar rubber-like member 3' is interposed between the shells 2' and 4'. The frame is shown as formed with cross members such as the tubes 7, 7'. Near the center plane of the vehicle (or near the opposite longitudinal frame member) the tubes 7, 7' are shown provided with abutments 8, 8' fixedly and preferably adjustably attached to the tubes 7, 7' by any suitable means (as by the means shown in Fig. 5 of British Patent 426,703). To said abutments 8, 8' are attached, respectively, one end of the torsion bars 9, 9', the other ends of which are fixedly or adjustably attached to the lever members 1, 1' as by means of the pins 12, 12'. Preferably rigidly connected to the levers 1, 1' and the shells 2, 2' are members, shown as tubes 11, 11' and extending to the abutment members 8, 8'. The tubular members 11, 11' are shown connected to the abutment members 8, 8' by universal joint means which, as shown, take the form of an annulus 10, 10' of rubber or the like.

It will be seen therefore that upon the application of vertical forces or shocks to the wheel they will be transmitted to the wheel carrying levers 1, 1' and resiliently transmitted to the frame, in part through the twisting of the torsion bars 9, 9', assisted by the resistance to rotation set up by the rubber like members 3, 3' and in part through the resistance to vertical movement set up by the rubber-like members 3, 3'. Furthermore, longitudinal shocks are absorbed by the longitudinal yield of the rubber-like members 3, 3'.

As the point of connection between the levers 1, 1' and the wheel carrying means is located outwardly of the rubber-like members 3, 3' the torsion bars 9, 9' would ordinarily be subjected to rather considerable bending stresses. The tubular members 11, 11' serve to sustain these stresses and transmit them to the frame through the abutment members 8, 8' and the joint means 10, 10'.

While the device shown in Fig. 1 is of the type in which a quadrilateral linkage wheel carrying means is shown it is to be understood that the road wheel may be carried directly upon the outer end of either arm 1 or 1' as in the device shown, for example, in said British Patent 426,703, and furthermore, that even where a quadrilateral linkage is employed spring suspension means in accordance with the invention may be applied to only one of said levers, the other being journaled to the frame by any suitable journal means, either metallic or rubber supported.

In any of said forms of application it will be understood that $r$ designates the radius of the circle through which the road wheel carrier connection 13 moves during spring action, while $+s$ and $-s$ designate the projection of its path upon the longitudinal central plane of the vehicle, while $+d$ and $-d$ designate the projection thereof upon the transverse plane and represent the extent of track alteration during springing. It will be seen that due to the length of the radius $r$ permitted by the construction of the invention the amount of track alteration due to the springing action is kept very small.

It will be seen that the invention permits of the greatest freedom in the selection of the dimensions of the suspension parts, whether a rubber spring alone or a rubber spring combined with a steel torsion bar is utilized, thus making it easy to secure any desired springing characteristic and any desired degree of progressiveness of the springing, while at the same time the vibration of the wheels is effectively damped. A further advantage is that the shortening of the rotary spring member, as the torsion bars 9, 9' due to the twisting thereof during the springing operation is permitted by the rubber elements 3, 3'. Furthermore, the construction permits of light weight, easy assembly and disassembly, few parts and the requirement of a minimum space. Furthermore the rubber-like elements are in close proximity, over large areas with metal parts so that the heat generated in the rubber by hysteresis is readily conducted away so as to prevent the occurrence of high temperatures, which effect is further increased by the intimate connection between the members 4, 4' and the frame and the members 2, 2' and the levers 1, 1'. Furthermore since there are no metal to metal moving parts lubrication is entirely unnecessary. It will be seen therefore that the invention provides a cheap, reliable and highly efficient spring suspension which requires little or no attention in use.

The word "frame" as herein used is not to be understood as limited to such a device when formed separate from the body or coachwork of the vehicle, but as including corresponding means when forming part of or intimately interconnected with said body or coachwork of the vehicle.

Thus it will be noted that the construction shown and described will serve admirably to accomplish the objects stated above. It is to be understood, however, that the constructions disclosed above are intended merely as illustrative of the invention and not as limiting as various modifications therein may be made without departing from the invention as defined by a proper interpretation of the claims which follow:

I claim:

1. Spring suspension for vehicles including a frame, road wheels carrying means comprising an arm connected to a road wheel and formed with a journal extension, rubber-like interconnecting means of annular form generally concentric with said journal extension, between said journal extension and the frame near said arm, the interconnection between the journal extension and frame taking place through the side faces of the annulus, a second rubber-like interconnecting means between said journal extension and said frame located at a distance from said arm, and rotary spring means connected at one end to said arm and at its other end to said frame.

2. The combination according to claim 1, in which the second rubber-like means is of tubular form.

3. Spring suspension means for vehicles including a frame, road wheel carrying means comprising an arm connected to a road wheel and formed with a journal extension, cup-shaped members attached respectively to the arm and to the frame, rubber-like interconnecting means between said journal and the frame near said arm, of annular form, located between said cup-shaped members, a second rubber-like interconnecting means between said journal extension and said frame located at a distance from said arm, and rotary spring means connected at one end to said arm and at its other end to said frame.

4. Spring suspension means for vehicles including a frame, road wheel carrying means comprising an arm connected to a road wheel and formed with a journal extension, rotary spring means connected between said arm and the frame, said rubber-like interconnecting means being of annular form generally concentric with said rotary spring means, the interconnection between the journal extension and frame taking place through the side faces of the annulus, and a second rubber-like interconnecting means between said journal extension and said frame.

5. Spring suspension means for vehicles including a frame, road wheel carrying means and means for resiliently connecting said carrying means to said frame comprising rotary spring means attached to said wheel carrying means and to said frame, and an annular rubber-like member surrounding said rotary spring means and resiliently interconnected between said carrying means and said frame, said interconnection taking place through the side faces of the annulus and a tubular bending stress supporting member attached at one end to said wheel carrying member and at the other end to the frame substantially at the center of the vehicle and surrounding said tubular spring member.

6. In spring suspension means for vehicles including a frame, a road wheel carrying arm and means for resiliently connecting said carrying arm to said frame comprising rotary spring means attached to said wheel carrying arm and to said frame, a tubular bending stress supporting journal member attached at one end to said wheel carrying member and at the other end to the frame, and means interposed between said tubular journal member and said frame substantially at the center of the vehicle for permitting radial movement of said tubular journal member relative to said frame in all directions.

7. Spring suspension means for vehicles including a frame, road wheel carrying means comprising an arm connected to a road wheel and formed with a journal extension, rubber-like interconnecting means between said journal and the frame near said arm, and a second rubber-like interconnecting means between said journal extension and said frame located near the central plane of the vehicle.

8. Spring suspension means for vehicles including a frame, road wheel carrying means comprising an arm connected to a road wheel and formed with a journal extension, rotary spring means connected between said arm and frame, a rubber-like interconnecting means between said arm and said frame, a second rubber-like interconnecting means between said journal extension and said frame, and an abutment intermediate said rotary spring means and said frame, said journal extension being of tubular form, surrounding said rotary spring means, and being connected to said abutment through said rubber-like means.

KARL RABE.